United States Patent [19]
Vicard et al.

[11] Patent Number: 5,434,849
[45] Date of Patent: Jul. 18, 1995

[54] DUPLEX MODEM FOR PROCESSING DATA NEEDED FOR CANCELLING FAR-END ECHO CANCELLER

[75] Inventors: Dominique Vicard, Echirolles; William Glass, Seyssinet-Pariset; Francois Druilhe, Seyssins, all of France

[73] Assignee: SGS-Thomson Microelectronics S.A., Gentilly, France

[21] Appl. No.: 926,813

[22] Filed: Aug. 7, 1992

[30] Foreign Application Priority Data

Aug. 9, 1991 [FR] France ................... 91 10424

[51] Int. Cl.⁶ .............................................. H04B 3/23
[52] U.S. Cl. ........................................ 370/32.1; 375/8; 375/222; 379/410
[58] Field of Search ............... 370/24.31, 32, 32.1; 379/406, 410, 411; 375/7/8

[56] References Cited

U.S. PATENT DOCUMENTS

| | | | |
|---|---|---|---|
| 4,742,510 | 5/1988 | Quatieri, Jr. et al. | 370/32.1 |
| 4,841,561 | 6/1989 | Hill | 375/8 |
| 4,893,305 | 1/1990 | Fernandez et al. | 375/8 |
| 4,970,715 | 11/1990 | McMahan | 370/32.1 |
| 5,005,168 | 4/1991 | Cummiskey et al. | 375/8 |
| 5,007,047 | 4/1991 | Sridhar et al. | 370/32.1 |
| 5,029,204 | 7/1991 | Shenoi et al. | 370/32.1 |
| 5,177,734 | 1/1993 | Cummiskey et al. | 370/32.1 |
| 5,214,637 | 5/1993 | Sridhar et al. | 370/32 |

FOREIGN PATENT DOCUMENTS 0385136 9/1990 European Pat. Off. .
63-236422 10/1988 Japan .

OTHER PUBLICATIONS

Electronic Design, vol. 37, No. 8 Apr. 1989, Hasbrouck Heights, N.J., pp. 137–142, 'DSP Quashes Echoes in V. 32 Modems'.
Patent Abstracts of Japan, vol. 13, No. 38 (E–709) (3386) 27 Jan. 1989.

*Primary Examiner*—Alpus Hsu
*Attorney, Agent, or Firm*—Wolf, Greenfield & Sacks

[57] ABSTRACT

A duplex modem for processing data needed for cancelling far-end echo includes at least one high-speed processor of the data pump type performing filtering operations and a microcontroller. The data, corresponding to transmitted data and necessary for cancelling far-end echoes, are stored in a memory associated with and controlled by the microcontroller.

20 Claims, 3 Drawing Sheets

5,434,849

DUPLEX MODEM FOR PROCESSING DATA NEEDED FOR CANCELLING FAR-END ECHO CANCELLER

BACKGROUND OF THE INVENTION

The present invention relates to modulators/demodulators (modems) capable of simultaneous bilateral transmission (duplex) in the same frequency band, on a two-wire line.

As is known, a far-end echo canceller is used for reception in such modems.

The general arrangement of such a modem is, for example, illustrated in the figures appearing on pages 140 and 141 of Modem Data Book and Applications, first edition, May 1989, by SGS-THOMSON Microelectronics (ST). As is also known and indicated in the description associated with the above figures, an echo canceller generally comprises two channels, a channel for cancelling the near-end echoes associated with the emitter coupler and the parts close to the line, and a channel for cancelling far-end echoes corresponding, for example, to a transmission through one or several satellites. The far-end echo canceller must receive a signal corresponding to the transmitted signal delayed by the duration of the transmission and the echo on satellites, that is, for example, a duration of about one second. This implies the use of a delay line, in practice a memory, with a high storing size, for example, about 4k words for the above delay.

In a conventional modem architecture, a general-purpose microcontroller is provided; it can be constituted by the central processor of a personal computer to which the modem is coupled, especially comprising interface circuits with the data terminal equipment (DTE) transmitting and receiving data through the modem, a DTE control interpreter, data compression circuits, and error correction circuits. The specific functions of the modem, and especially the echo cancelling function, are achieved on one or several independent integrated circuits especially comprising a high-speed processor for achieving very fast calculations necessary to implement these functions. These circuits are commonly called data pump circuits.

More particularly, in conventional architectures, the data pump, ensuring the echo cancellation, has to be associated with the memory storing the transmitted signals. To be consistent with the remaining elements provided in the data pump, this memory is a high-speed memory, the access time of which is higher by several orders of magnitude than those required for a complete memory function, as, for example, those memories used in an SRAM-type memory, which occupies a relatively large surface. In numerous cases, for example, in the case of the above SGS-THOMSON circuit, this memory is constituted by an integrated circuit chip distinct from the data pump itself. In fact, a monolithic integration would generally involve the use of a chip with a too large surface.

This conventional architecture therefore exhibits several drawbacks.

A first drawback lies in the fact that, as indicated, the provision of a specific external memory is compulsory.

A second drawback, associated with the first, is that it is necessary to ensure an address and data link between the data pump and its external memory. When the memory has a 4k word size, it is to be noted that addressing must be made on at least 12 bits. This implies that 12 pads must be provided for this addressing, which increases the size of the data pump chip.

SUMMARY OF THE INVENTION

An object of the invention is to provide a new modem architecture comprising an echo canceller which overcomes the above drawbacks.

To achieve this object, the invention provides a duplex modem for processing data needed for cancelling far-end echo comprising at least one high-speed processor of the data pump type achieving filtering operations, a monitoring microcontroller, required for cancelling far-end echoes, and a memory, managed by the microcontroller, in which are stored data corresponding to the transmitted data, needed for cancelling far-end echoes.

BRIEF DESCRIPTION OF THE DRAWINGS

The foregoing and other objects, features and advantages of the invention will be apparent from the following detailed description of preferred embodiments as illustrated in the accompanying figures wherein.

DETAILED DESCRIPTION OF THE INVENTION

Figure 1:
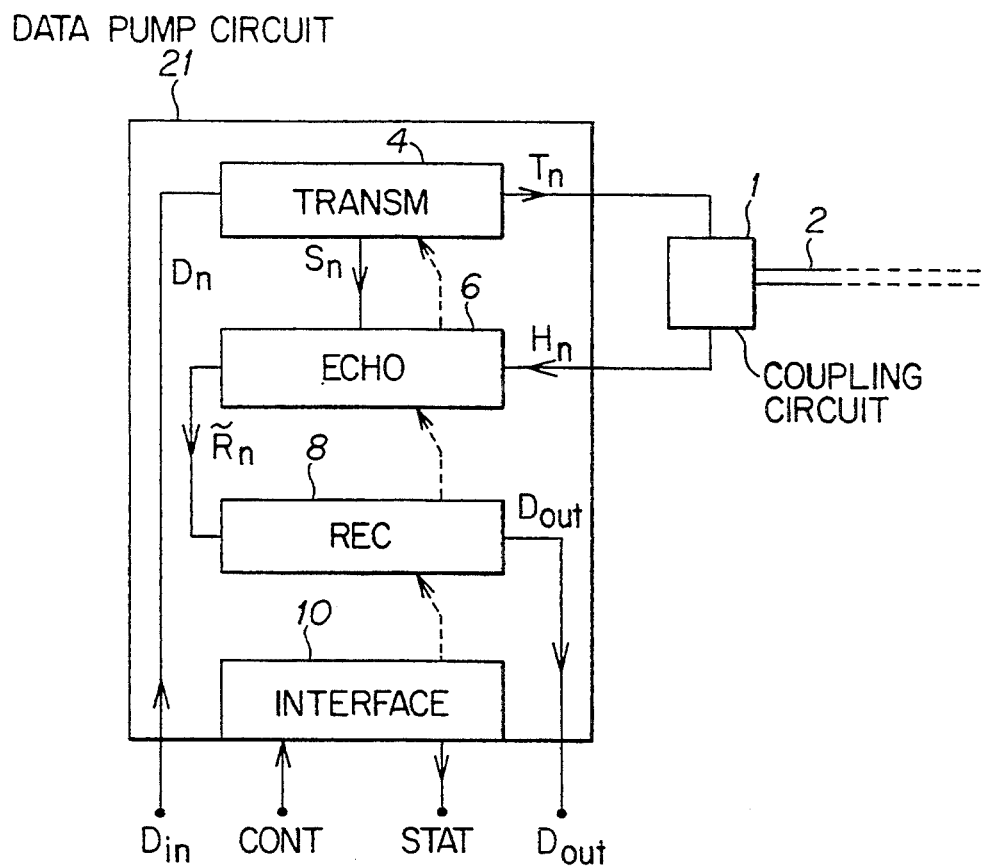
FIG. 1 illustrates the main components of a conventional data pump comprising an echo canceller.

FIG. 1 shows the main components of a data pump circuit 21, generally grouped on one or several chips of a modem. This circuit is intended to transmit and receive signals through a coupling circuit 1 connected to a two-wire line 2. The transmission circuit 4 transmits signals Tn to the coupling circuit 1. These signals Tn are signals that have been subject to various scrambling and coding processing and correspond to input data Din. Signals Hn received from the coupling circuit 1 are transmitted to an echo canceller 6. The echo canceller 6 receives signals Sn corresponding to data Din partially or fully processed by the transmission circuit 4. Echo-free signals $R_n$ are transmitted to a receiver 8 which descrambles them and provides output data Dout. The operation of circuits 4, 6 and 8 in data pump 21 is monitored and controlled by an external controller (shown in FIG. 3) providing control signals CONT to an interface circuit 10 which controls the receiver, the echo canceller and the emitter, and receives from them state signals (STAT) which it sends back to the controller.

Figure 2:
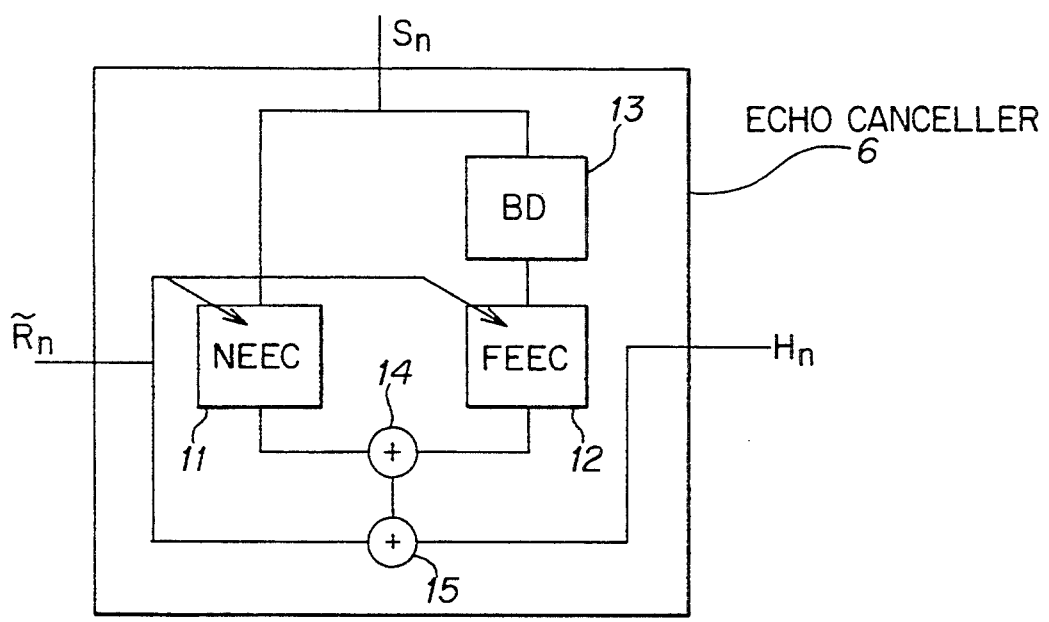
FIG. 2 schematically shows a conventional echo canceller.

FIG. 2 schematically shows that the echo canceller 6 comprises two channels, a near-end echo canceller channel (NEEC) 11 and a far-end echo canceller channel (FEEC) 12. The near-end echo canceller 11 receives signals Sn associated with the transmitted signals and the far-end echo canceller receives these signals Sn through a delay circuit 13. The signals from the near-end and far-end echo cancellers are added in a first summing integrator 14 and are then added to signal Hn through adder 15 to provide the echo-free signal $R_n$.

Figure 3:
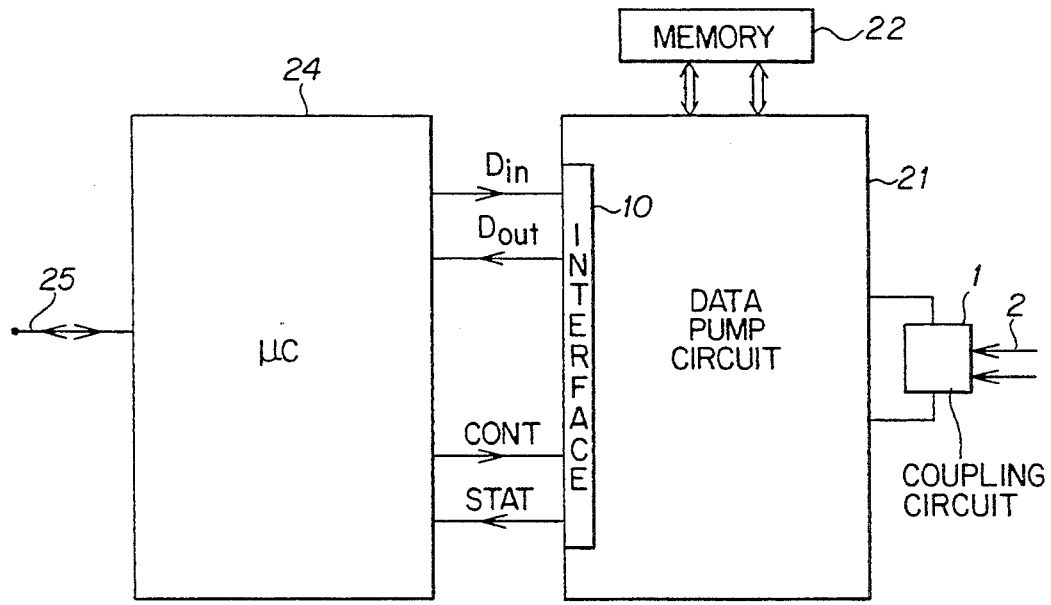
FIG. 3 shows a conventional modem architecture illustrating the association of the circuit of FIG. 1 with a data controller.

FIG. 3 shows an aspect of the conventional modem architecture. The data pump circuit 21 of FIG. 1 is connected with the coupling circuit 1, with a memory 22 performing the function of delay line 13 in FIG. 2, and with a microcontroller 24 through the interface circuit 10. Conventionally, the microcontroller, as above indicated, exchanges data with a data terminal to which the modem is connected, through a line or more precisely a bus 25. Generally, the microcontroller comprises internal high-speed storage areas and external, possibly slower, storage areas.

Figure 4:
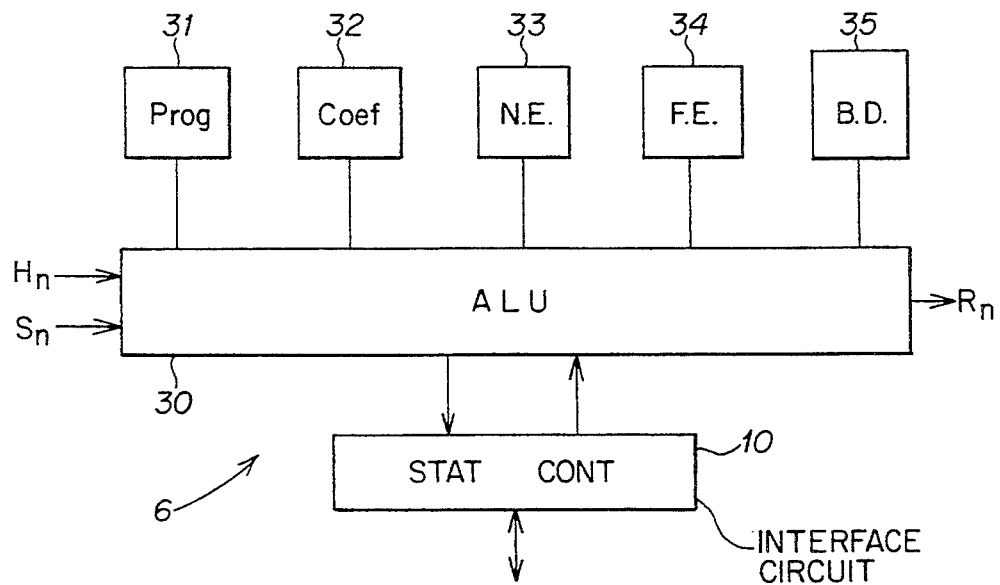
FIG. 4 shows an embodiment of an echo canceller according to the prior art.

FIG. 4 schematically illustrates a practical embodiment of an echo canceller 6. This echo canceller mainly comprises an arithmetic and logic unit (ALU) or high-speed processor 30 intended to perform calculations on previously defined data Sn and Hn. To achieve this purpose, ALU 30 is associated with various memories, 31 to 35. Memory 31 is a memory containing the operation program of ALU 30. Memory 32 is a memory of coefficients that are used for cancellation operations. Memory 33 is a memory containing symbols or signals for the near-end (NE) echo canceller. Memory 34 is a memory containing symbols or signals for the far-end (FE) echo canceller. Memory 35 corresponds to the delay line 13 associated with the processing of far-end echo signals. In a conventional embodiment, memory 31 will have a size of about 2k words, memories 32-34 a size of 128 words and memory 35, used as a delay line, a size of about 4k words.

Since it is the same arithmetic and logic unit 30 which operates with the various memories, these various memories are generally achieved in the same technology, namely, a very high-speed technology, necessary for processing data stored in memories 33 and 34 in association with the coefficients stored in memory 32. Thus, generally, all these memories are relatively cumbersome, and are implemented, for example, in SRAM technology. Also, usually, memories 31-34 are located on the same chip as the one which incorporates the ALU 30, while memory 35, having a larger storage size, is usually located in a separate chip to which the ALU is connected through a large number of pins, since this memory necessarily has a large number of addresses.

As mentioned above, ALU 30 is clocked by the control signals CONT from microcontroller 24 through the interface 10 and sends back state signals STAT. The invention is based on an analysis of the conventional circuit of FIG. 4. In practice, the input and output rate of data Hn, Sn, and $R_n$ is very slow with respect to the rate necessary to achieve the calculations concerning the data stored in memories 32-34. But, the data stored in memory 35 can be provided only at the same rate as data Hn, Sn, and Rn. Thus, the invention provides, to store the data intended to calculate the far-end echo, a memory associated with the microcontroller 24 instead of being directly associated with the ALU 30.

Figure 5:
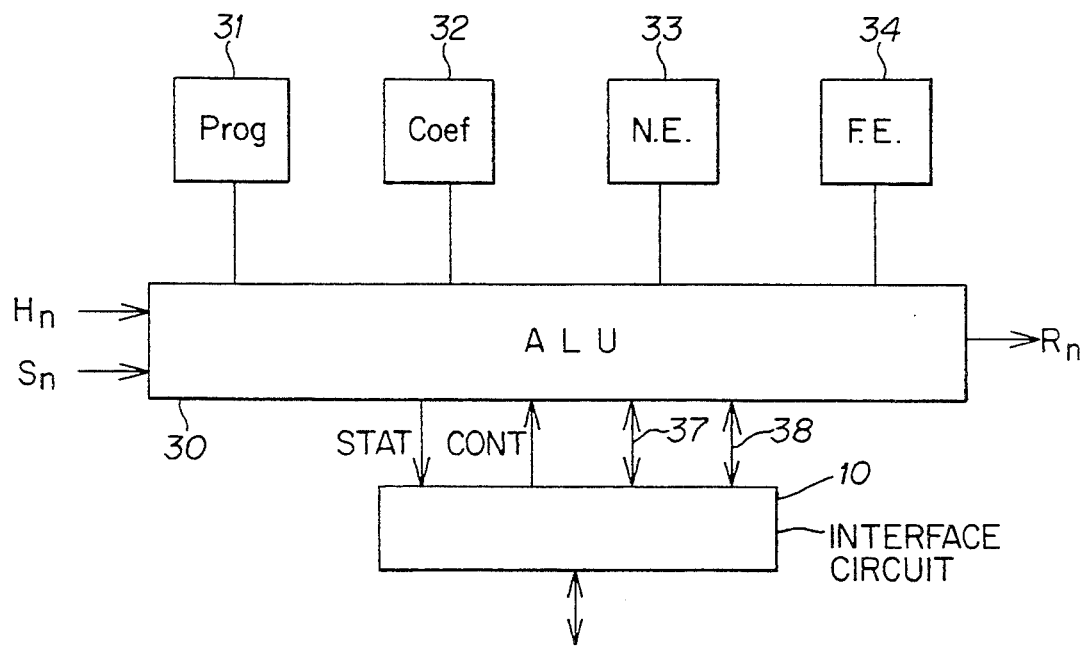
FIG. 5 shows an embodiment of an echo canceller according to the invention.

An exemplary architecture implementing the invention is illustrated in FIG. 5 which shows the same elements as those of FIG. 4 with the same reference characters. The main difference is that the delay memory 35 is eliminated and replaced with data links 37, 38 to the interface 10, thus enabling interface 10 to send to the microcontroller 24 data with virtual addresses and to recall these data at these virtual addresses, wherein the microcontroller performs the storage management. In fact, the microcontroller is generally associated with a large-size memory, for example ranging about from 64k words to 1M word and there always is enough room available in this memory to store the 4k words normally provided in memory 35.

It will be noted that communication between the interface circuit 10 and a corresponding interface circuit 44 in the microcontroller can be realized using the number of lines normally used to exchange data, control and state signals, for example, on a 8-line bus in which data are sent in series form. Thus, with the invention, the number of links between the data pump and the microcontroller is not increased and the very numerous connections required to link this data pump to a memory 22, such as illustrated in FIG. 3, are eliminated (it will be noted that reference 22 of FIG. 3 and reference 35 of FIG. 4 designate memories performing the same function).

Figure 6:
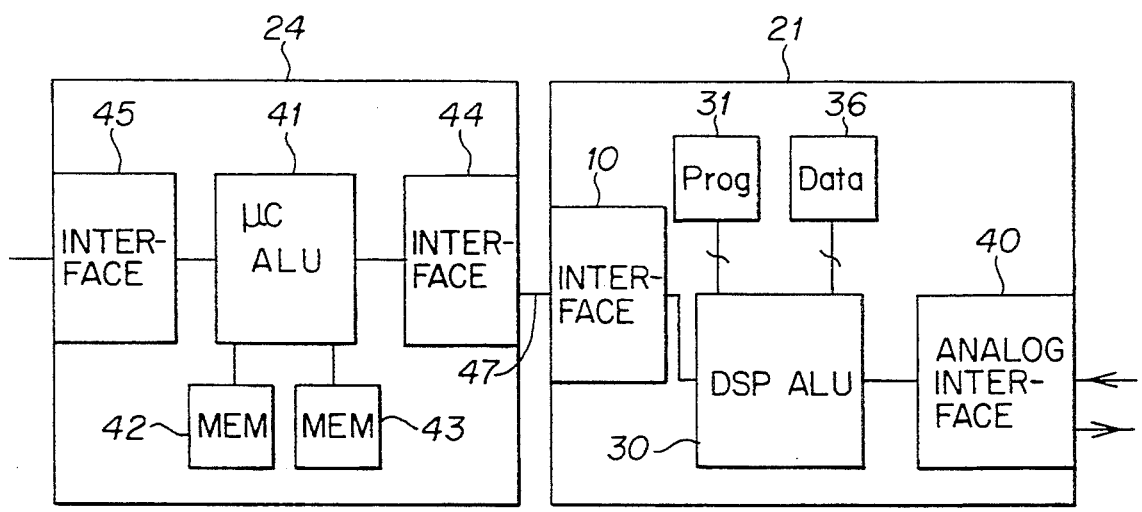
FIG. 6 shows the general architecture of a modem according to the invention.

FIG. 6 shows the modem architecture according to the invention and also illustrates the coupling between the microcontroller 24 and the data pump 21 according to the invention. The various elements above described are shown again with the same references. Especially, in the data pump 21, the figure shows ALU 30, the program memory 31, the various coefficient and data memories, grouped in a single memory 36, for processing the near-end and far-end echoes. The interface with the microcontroller is referenced 10 and an analog interface with the coupling circuit 1 is referenced 40. Indeed, although this has not been described above, one skilled in the art will appreciate that the circuit according to the invention comprises digital/analog and analog/digital conversion circuits to enable processing data in digital form in ALU 30, and the transmission and reception of data on the two-wire line in analog form. The microcontroller 24 comprises an ALU 41, connected to a program memory 42, for example a ROM-type memory, and to a data and parameter memory 43, for example a DRAM-type memory; the lather serving to store the data previously stored in memory 35. Memories 42 and 43 are generally located partially on the same chip as the microcontroller, the largest part being achieved in external chips in accordance with the technologies used. The microcontroller further comprises an interface circuit 44 with the data pump and an interface circuit 45 with the circuits generating the signals to be transmitted on the two-wire line and to be received from the latter. The link between the interfaces 10 and 44 is represented in the form of a single link 47. This link is, for example, a series link or a double access 8-bit storage area, or a mailbox. The double access memory allows both the data pump circuit and the microprocessor to write data into the double access memory and read data from the double access memory.

As is apparent to those skilled in the art, various modifications can be made to the above disclosed preferred embodiments, especially as regards the size of the various memories (the above values being given by way of example) and the links between the microcontroller and the data pump(s).

We claim:

1. A far-end echo canceller for a duplex modem that receives and transmits data, comprising:
   a processor preforming filtering operations of data received by the modem;
   a control microcontroller coupled to the processor to receive data from the processor and send data to the processor;

a memory, coupled to and controlled by the microcontroller, for storing the data received by the processor, the data including data corresponding to transmitted data needed for canceling far-end echoes; and further comprising an interface for coupling the processor to the microcontroller, the interface transmitting data and associated virtual addresses to the microcontroller and receiving data associated with a virtual address from the microcontroller.

2. The far-end echo canceller of claim 1, wherein the processor is a high speed data pump processor.

3. A far-end echo canceller for a duplex modem that receives and transmits data, comprising:

a processor performing filtering operations on data received by the modem;

a control microcontroller coupled to the processor to receive data from the processor and send data to the processor; and a memory, coupled to and controlled by the microcontroller, for storing the data received from the processor, the data including data corresponding to transmitted data needed for cancelling far-end echoes;

further comprising an interface for coupling the processor to the microcontroller, the interface transmitting data and associated virtual addresses to the microcontroller and receiving data associated with a virtual address from the microcontroller; and said far-end echo canceller further comprising a data link, coupling between the interface and the processor.

4. The far-end echo canceller of claim 3, wherein the data link comprises a series link coupled between the processor and the microcontroller.

5. The far-end echo canceller of claim 3, wherein the data link comprises a double access memory accessible by the processor or the microcontroller coupled between the processor and the microcontroller.

6. The far-end echo canceller of claim 3, wherein the data link comprises a mailbox storing data and associated virtual addresses.

7. The far-end echo canceller of claim 3, wherein the memory comprises a portion of a memory associated with the microcontroller.

8. The far-end echo canceller of claim 7, wherein the memory associated with the microcontroller is a DRAM-type memory.

9. A far-end echo canceller for a duplex modem that receives and transmits data comprising;

a processor means for performing filtering operations on data received by the modem;

a control microcontroller means, coupled to the processor means, for receiving data processed by the processor means and sending data to the processor means;

a memory means coupled to and controlled by the control microcontroller means, for storing the data processed by and received from the processor means, the data including data corresponding to transmitted data needed for canceling far-end echoes; and further comprising an interface means for coupling the processor means to the microcontroller means, the interface means further comprising means for transmitting data and associated virtual addresses to the microcontroller means and means for receiving data associated with a virtual address from the microcontroller means.

10. The far-end echo canceller of claim 9, wherein the memory means comprises a portion of a memory of the microcontroller means.

11. The far-end echo canceller of claim 10, wherein the memory means comprises DRAM-type memory.

12. The far-end echo canceller of claim 9, wherein the processor means is a high speed data pump processor means.

13. A far-end echo canceller for a duplex modem that receives and transmits data, comprising:

a processor means for performing filtering operations on data received by the modem;

a control microcontroller means, coupled to the processor means, for receiving data processed by the processor means and sending data to the processor means; and a memory means, coupled to and controlled by the control microcontroller means, for storing the data processed by the and received from the processor means, the data including data corresponding to transmitted data needed for cancelling far-end echoes;

further comprising an interface means for coupling the processor means to the microcontroller means, the interface means further comprising means for transmitting data and associated virtual addresses to the microcontroller means and means for receiving data associated with a virtual address from the microcontroller means; and said far-end echo canceller further comprising data link means for coupling between the interface means and the processor means.

14. The far-end echo canceller of claim 13, wherein the data link means comprises a series link means.

15. The far-end echo canceller of claim 13, wherein the data link means comprises a double access memory means, accessible by the processor means or the microcontroller means.

16. The far-end echo canceller of claim 13, wherein the data link means comprises a mailbox means.

17. A duplex modem that receives and transmits data, comprising:

a data pump circuit including a transmission circuit, an echo canceller circuit coupled to the transmission circuit, and a receiver circuit coupled to the echo canceller circuit, the echo canceller circuit comprising a far-end echo canceller, the far-end echo canceller having a processor means for performing filtering operations on data received by the modem;

a control microcontroller means, coupled to the data pump circuit, for receiving data processed by the data pump circuit and sending data to the data pump circuit; and a memory means, coupled to and controlled by the control microcontroller means, for storing the data received from the data pump circuit, the data corresponding to transmitted data needed for cancelling far-end echoes.

18. The duplex modem of claim 17, further comprising an interface means, coupling the processor means to the microcontroller means, for transmitting data and associated virtual addresses to the microcontroller means and for receiving data associated with a virtual address from the microcontroller means.

19. The duplex modem of claim 18, wherein the memory means comprises a portion of a memory of the microcontroller means.

20. In a duplex modem that receives and transmits data comprising a data pump circuit including a transmission circuit, an echo canceller circuit coupled to the transmission circuit, and a receiver circuit coupled to the echo canceller circuit, the echo canceller circuit comprising a far-end echo canceller, the far-end echo canceller having a processor means for performing filtering operations on received data and a control microcontroller means, coupled to the data pump circuit, a method for processing data needed for cancelling far-end echo, comprising the steps of:

providing a memory controlled by the microcontroller means;

storing data including data corresponding to transmitted data needed for cancelling far-end echoes and associated virtual addresses in the memory by transmitting the data and associated virtual addresses from the processor means to the microcontroller means;

recalling data stored in the memory at an associated virtual address by transmitting a virtual address from the processor means to the microcontroller means; and processing the recalled data to cancel far-end echoes.

* * * * *